Patented Oct. 10, 1939

2,175,794

UNITED STATES PATENT OFFICE 2,175,794

AZO DYESTUFFS SOLUBLE IN WATER

Erich Fischer and Walter Gmelin, Bad Soden in Taunus, and Richard Huss, Frankfort-on-the-Main-Hochst, Germany, assignors to General Aniline Works, Inc., New York, N. Y., a corporation of Delaware No Drawing. Application March 19, 1938, Serial No. 196,900. In Germany March 23, 1937

4 Claims. (Cl. 260—198)

The present invention relates to azo-dyestuffs soluble in water; more particularly, it relates to dyestuffs of the following general formula:

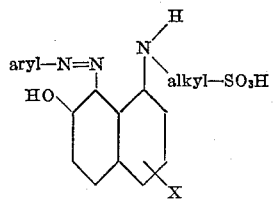

wherein X stands for hydrogen or a sulfonic acid group.

We have found that valuable azo-dyestuffs soluble in water are obtainable by combining any diazo-compound with a 1-amino-7-hydroxynaphthalene of the general constitution:

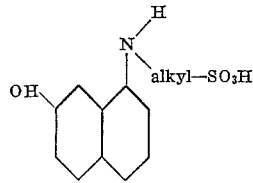

wherein the naphthalene nucleus may contain a further sulfonic acid group.

The dyestuffs thus obtained have the valuable property of dyeing leather in the grain or throughout shades extending from violet to blue to black. As far as diazo-compounds of the benzene series are used for the manufacture of the dyestuffs and the finished dyestuffs contain besides the alkyl-SO₃H-group no further sulfonic acid group, the dyestuffs are particularly adapted for dyeing wool from an acid bath below boiling temperature, the dye-baths being sufficiently or very well exhausted.

The following examples serve to illustrate the invention, but they are not intended to limit it thereto; the parts are by weight:

1. Into a solution obtained from 253 parts of 1 - sulfethylamino - 7 - hydroxynaphthalene (obtainable by condensing 1-amino-7-hydroxynaphthalene with sodium chlorethanesulfonate in the presence of an acid-binding agent), water and 212 parts of sodium carbonate there is introduced a diazo-solution obtained in the usual manner from 93 parts of aminobenzene. When the coupling is complete, the dyestuff is salted out from the solution in the usual way, filtered with suction and dried. It dyes leather in the grain grey-black tints. Furthermore it dyes wool in an acid bath below boiling temperature with good exhaustion of the dye-bath. The dyestuff corresponds with the following formula:

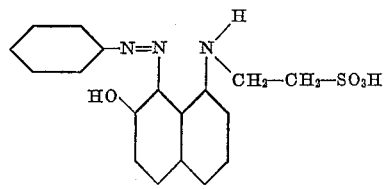

2. If in Example 1 the aminobenzene is exchanged for 123 parts of 1-amino-2-methoxybenzene, a dyestuff of similar properties is obtained.

3. 203 parts of 1-amino-4-methoxybenzene-2-sulfonic acid are diazotised in the usual manner and coupled with an aqueous solution of 253 parts of 1-sulfethylamino-7-hydroxynaphthalene and 212 parts of sodium carbonate. The dyestuff is salted out, filtered with suction and dried. It is a black powder which dyes leather throughout grey-black shades.

4. 123 parts of 1-amino-4-methoxybenzene (molecular weight 123) are diazotised in the usual manner at 0° C.-3° C. in the presence of hydrochloric acid in excess with 69 parts of sodium nitrite. The diazo-solution is then caused to run, while stirring, into an aqueous solution, cooled to 0° C., of 410 parts of the disodium salt of 1-sulfethylamino-7-hydroxynaphthalene-4-sulfonic acid (molecular weight 391, obtainable by condensing 1-amino-7-hydroxynaphthalene-4-sulfonic acid with sodium chlorethanesulfonate in the presence of an acid-binding agent), in the presence of 250 parts of anhydrous sodium carbonate. The dyestuff, the formation of which is very quickly completed, is isolated in the usual manner and dried. It is a black powder which dissolves in water to a grey-violet solution and is, for instance, very suitable for dyeing leather.

Chrome-tanned velvet-leather is well drummed before dyeing. It is then dyed in a fresh bath with 8 per cent. of the above dyestuff, calculated upon the dry-weight of the leather. After 2 hours' dyeing, 4 per cent. of formic acid are gradually added and the leather is further drummed for one hour. It is then thoroughly rinsed and dried. The leather is dyed in the grain grey-violet tints and may, therefore, well be buffed.

5. 173 parts of 1-aminobenzene-4-sulfonic acid are diazotised in the presence of 150 parts of concentrated hydrochloric acid with 69 parts of sodium nitrite. The diazo-compound is then gradually introduced into an aqueous solution, cooled to 0° C., of 253 parts of 1-sulfethylamino-7-hydroxynaphthalene to which there have been added 159 parts of sodium carbonate. The dyestuff thus obtained is separated in the usual manner by means of sodium chloride, filtered with suction and dried. It is a black powder which dyes leather throughout grey-black tints.

6. If in Example 5 the 1-aminobenzene-4-sulfonic acid is exchanged for 187 parts of para-aminobenzylsulfonic acid, a black dyestuff is obtained which likewise dyes leather throughout grey-black tints.

7. A dyestuff dyeing leather throughout grey-black tints is obtained by combining a diazo-solution, prepared in the usual manner from 310 parts of 4-amino-2-sulfophenylmethyltaurine, with a solution of 253 parts of 1-sulfethylamino-7-hydroxynaphthalene in the presence of sodium carbonate in excess.

8. A diazo-solution from 151 parts of 1-aminobenzene-3-carboxylic acid methyl-ester is run at 0° C. into a solution of 253 parts of 1-sulfethyl-amino-7-hydroxynaphthalene rendered alkaline by means of sodium carbonate. The dyestuff thus obtained is isolated in the usual manner and dried. It is a black powder which dyes leather black tints fast to buffing.

9. A dyestuff dyeing leather in the grain black tints is obtained by diazotising 230 parts of para-aminosulfacetanilide in the usual manner and combining the diazo-solution in the presence of sodium carbonate in excess with a solution of 253 parts of 1-sulfethylamino-7-hydroxynaphthalene.

10. 218 parts of 1-amino-2-nitrobenzene-2-sol-fonic acid are diazotised in the usual manner and the diazo-solution is combined, while vigorously stirring, at 0° C. in the presence of 250 parts of anhydrous sodium carbonate with an aqueous solution of 390 parts of the disodium salt of 1-sulfomethylamino-7-hydroxynaphthalene-3-sulfonic acid (molecular weight 377, obtainable by the action of formaldehyde bisulfite on an aqueous solution of the sodium salt of 1-amino-7-hydroxynaphthalene-3-sulfonic acid at 50° C. to 60° C.). The dyestuff is separated by means of potassium chloride, filtered with suction and dried. It is a black powder which dissolves in water to a grey-violet solution.

The dyestuff dyes leather reddish grey tints which may well be buffed and used for velvet effects.

11. A diazo-solution obtained in the usual manner from 172.5 parts of 4-chloro-2-nitro-1-aminobenzene is run, while stirring, at 0° C. into an aqueous solution of 390 parts of the disodium salt of 1-sulfomethylamino-7-hydroxynaphthalene-3-sulfonic acid (molecular weight 377) and 250 parts of anhydrous sodium carbonate. When the formation of the dyestuff is complete, it is separated by means of sodium chloride, filtered with suction and dried. There is obtained a black powder which dissolves in water to a grey-violet solution. The product is suitable for dyeing leather grey tints which may well be buffed.

12. 172.5 parts of 2-chloro-4-nitro-1-aminobenzene are diazotised in the usual manner and combined at 0° C., while vigorously stirring, with an aqueous solution of 390 parts of the disodium salt of 1-sulfomethylamino-7-hydroxynaphthalene-3-sulfonic acid and 250 parts of anhydrous sodium carbonate. When the formation of the dyestuff is complete, it separates in a form easily to be filtered. The dried dyestuff is a black powder which dissolves in water to a violet-grey solution and dyes leather in the grain greenish grey tints.

13. 299 parts of sodium 4-aminoazobenzene-4'-sulfonate are diazotised in the usual manner in the presence of hydrochloric acid in excess with 69 parts of sodium nitrite. The diazo-compound obtained is slowly introduced, while well stirring, at 0° C.–3° C. into an aqueous solution of 390 parts of the disodium salt of 1-sulfomethylamino-7-hydroxynaphthalene-3-sulfonic acid and 200 parts of anhydrous sodium carbonate. When the formation of the dyestuff is complete, it is separated by means of sodium chloride, filtered with suction and dried. It is a black powder which dissolves in water to a grey-violet solution. The dyestuff yields on leather black tints fast to buffing.

We claim:

1. The water-soluble azo-dyestuffs of the following general formula:

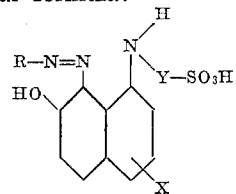

wherein R stands for a radical of the benzene series, X for one of the group consisting of hydrogen and the sulfonic acid group and Y for one of the group consisting of methyl and ethyl, being dark powders which penetrate deeply into the leather and yield shades extending from violet to blue to black.

2. The water-soluble azo-dyestuff of the following formula:

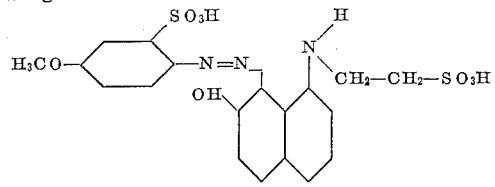

being a black powder which dyes leather throughout grey-black shades.

3. The water-soluble azo-dyestuff of the following formula:

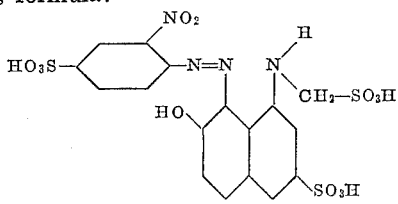

being a black powder which dissolves in water to a grey-violet solution and dyes leather in the grain reddish-grey shades.

4. The water-soluble azo-dyestuff of the following formula:

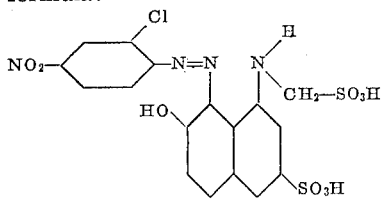

being a black powder which dissolves in water to a violet-grey solution and dyes leather in the grain greenish grey shades.

ERICH FISCHER.
WALTER GMELIN.
RICHARD HUSS.